United States Patent

[11] 3,623,604

[72] Inventor William L. Roberts
Franklin Township, Westmoreland County, Pa.
[21] Appl. No. 25,809
[22] Filed Apr. 6, 1970
[45] Patented Nov. 30, 1971
[73] Assignee United States Steel Corporation

[54] STRAIGHTNESS MONITOR
5 Claims, 8 Drawing Figs.

[52] U.S. Cl. .................................................. 209/80,
33/174
[51] Int. Cl. ........................................... B07c 3/12
[50] Field of Search.................................... 209/80;
33/174 E, 174 PA, 174 PB, 174 Q

[56] References Cited
UNITED STATES PATENTS
2,470,404  5/1949  Kloos ............................. 33/174 Q
2,765,076  10/1956  Casher ........................... 33/174 E Primary Examiner—Richard A. Schagher
Attorney—Rea C. Helm ABSTRACT: Lengths of rounds roll down parallel runners and over tolerance strips spaced away from and parallel to the plane of the runners. Out of straightness sections of the rounds contact the tolerance strips actuating circuitry for marking the length as to its straightness tolerance.

INVENTOR
WILLIAM L. ROBERTS

Attorney

INVENTOR
WILLIAM L. ROBERTS

By Rea C. Helm

Attorney

INVENTOR
WILLIAM L. ROBERTS

By *Rea C. Helm*

Attorney

STRAIGHTNESS MONITOR

This invention relates to apparatus for determining the straightness of elongated material and more particularly for determining whether elongated rounds meet straightness tolerances.

When steel is rolled into round sections, straightened and then cut into lengths, it is desirable to determine whether the lengths meet the accepted general tolerance limits of being out of straightness with one-quarter of an inch in 5 feet of length or the accepted special tolerance limit of being out of straightness within one-eighth inch in 5 feet of length. There are no devices that I am aware of that can monitor the straightness of a round length of material within these tolerances and mark and sort the lengths accordingly.

It is, therefore, an object of my invention to provide apparatus for determining the straightness classification of the length of an elongated round material.

Another object is to provide apparatus for marking and sorting lengths of elongated round material according to straightness classification.

These and other objects will be more apparent after referring to the following drawings and specifications, in which.

Figure 1:
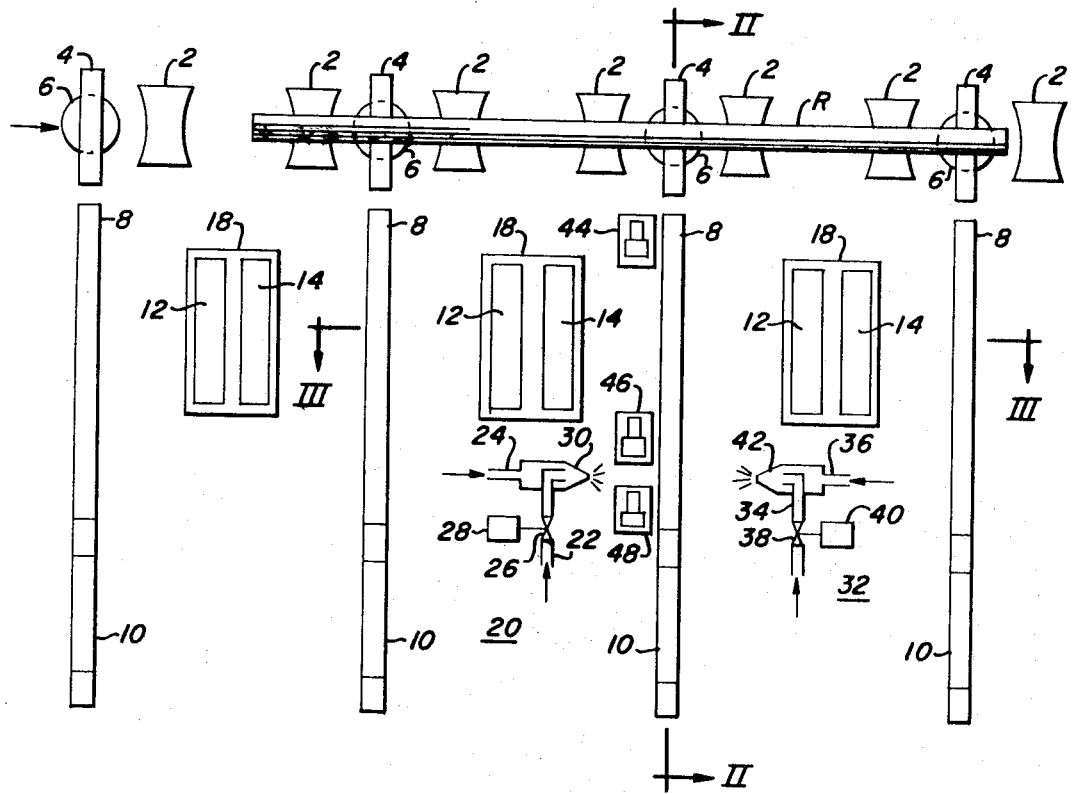
FIG. 1 is a schematic plan view of a conventional runout table incorporating my invention.

Referring now to the drawings, a round bar R is fed in the direction of the arrow of FIG. 1 from a straightener (not shown) onto a row of rollers 2. Lifters 4 which are raised by hydraulic cylinders 6 raise round R off rollers 2 transfer round R to parallel inclined runners 8 allowing round R to roll down into cradle 10. This is a conventional runout table for handling straightened lengths of round materials such as round steel bars. Although four inclined runners are shown, the number will vary depending on the length of the bars and spacing desired between runners.

A first set of inclined metal contact strips 12 and a second set of inclined metal contact strips 14 are located between each pair of adjacent inclined runners 8 and parallel to the plane of the runners. Strips 12 and 14 are each cemented to foam rubber 16 which, in turn, is cemented to a base 18 so that the strips 12 and 14 are electrically insulated from and elastically mounted upon base 18. The top faces of strips 12 and 14 are parallel to the surface level of runners 18 with strips 12 located one-eighth inch below the surface level and strips 14 located one-quarter inch below the surface level.

A special tolerance paint sprayer 20 positioned to apply paint to a bar rolling down runners 8 has a paint supply line 22 connected to a paint supply (not shown), a compressed-air line 24 connected to a compressed-air supply (not shown), a paint valve 26 in line 22 actuated by a solenoid 28 and a nozzle 30 connecting lines 22 and 24. A general tolerance paint sprayer 32 positioned to apply paint to a bar at a different location than the special tolerance spray 20 has a paint supply line 34, an air supply line 36, and valve 38 operated by a solenoid 40 and a nozzle 42. The paint sprayers may be conventional paint sprayers, either a wide fan type as shown or a plurality of smaller sprays.

A first proximity switch 44, which may be a sealed roller arm switch such as a type 30–400 manufactured by Licon Division of Illinois Tool Works, Inc., Chicago, Ill., is a normally open single pole, single throw switch located at the starting end of runners 8 so that as soon as a round starts to roll down runners 8, the switch is momentarily closed. A second proximity switch 46 of the same general type as switch 44 is a normally open double pole, single throw switch located so that a round will momentarily close the switch as soon as the round has rolled past strips 12 and 14. A third proximity switch 48 of the same general type is a normally closed single pole, single throw switch located so that a round will momentarily open the switch just before the round drops into cradle 10.

Figure 4:
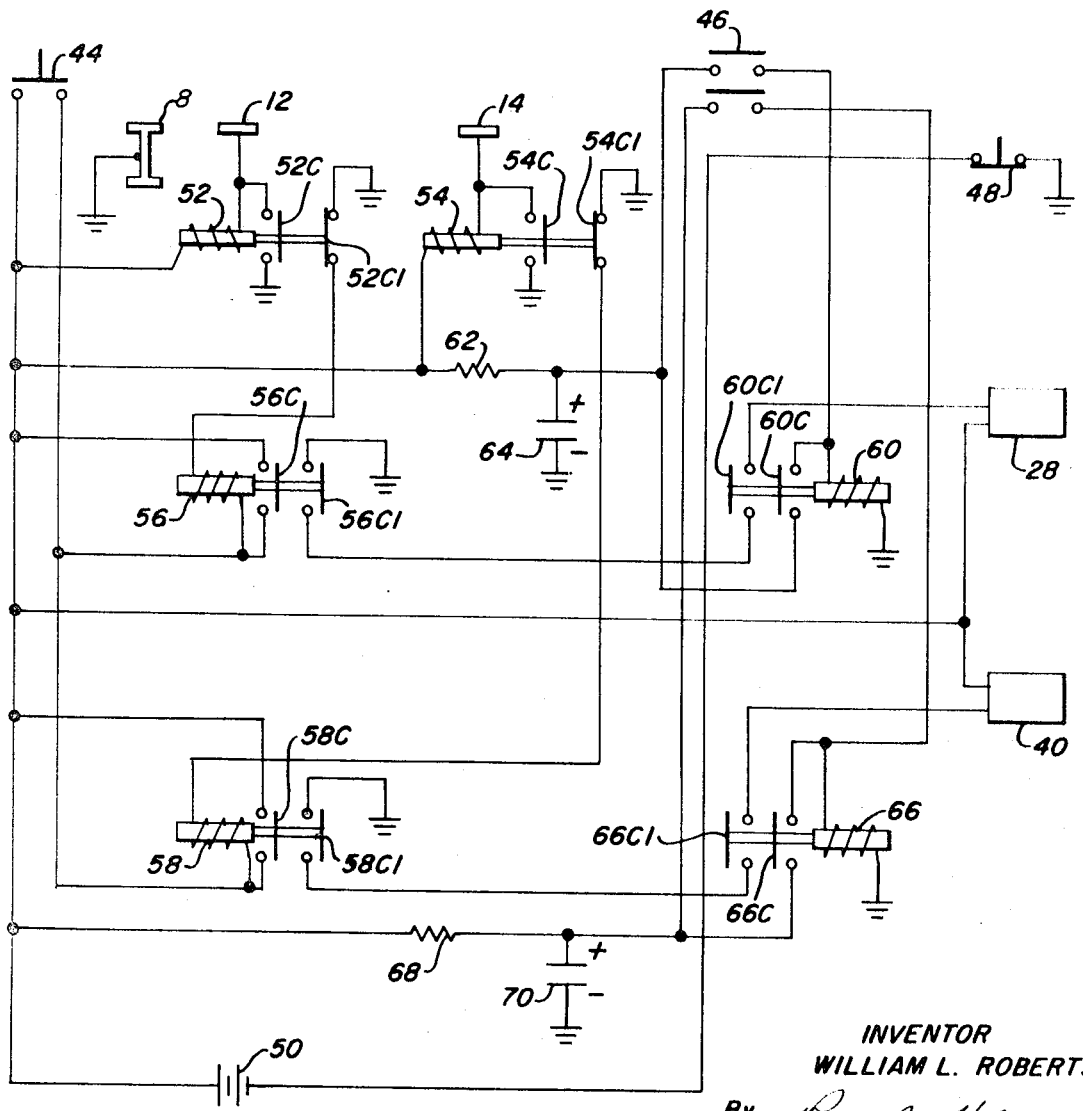
FIG. 4 is a schematic diagram of the control circuit of my invention.

A control circuit (FIG. 4) has a direct current power source 50 with its negative side connected to ground through switch 48 and its positive side connected to switch 44 and solenoids 28 and 40. Runners 8 are electrically connected to ground. A special tolerance relay coil 52 having normally open contacts 52C and normally closed contacts 52C1 is connected to source 50 through switch 48 and a grounding contact of a bar touching any of the contact strips 12 which are all electrically connected to coil 52. A general tolerance relay coil 54 having normally open contacts 54C and normally closed contacts 54C1 is connected to source 50 through switch 48 and a grounding contact of a bar touching any of the contact strips 14 which are all electrically connnected to coil 54.

Contacts 52C connect coil 52 to ground and contacts 52C1 connect the coil of a first paint spray relay coil 56 which has normally open contacts 56C and 56C1 to source 50 through ground switch 48 and switch 44 in parallel with contacts 56C. Contacts 54C connect coil 54 to ground and contacts 54C1 connect the coil of a second paint spray relay coil 58 which has normally open contacts 58C and 58C1 to source 50 through ground switch 48 and switch 44 in parallel with contacts 58C.

A first timing relay coil 60 which has normally open contacts 60C and 60C1 is connected to source 50 through ground switch 48, a first pole of switch 46 and a first resistance 62. A first capacitor 64 is connected between ground and the connection between resistance 62 and switch 46. Contact 60C is connected in parallel to the first pole of switch 46. A second timing relay coil 66 which has normally open contacts 66C and 66C1 is connected to source 50 through ground switch 48, a second pole of switch 46, and a second resistance 68. A second capacitor 70 is connected between ground and the connection between resistance 68 and switch 46. Contact 66C is connected in parallel with the second pole of switch 46. Solenoid 28 is connected to ground through contacts 60C1 and 56C1. Solenoid 40 is connected to ground through contacts 66C1 and 58C1.

In operation a round R is fed to rolls 2 and lifted off the rollers by lifters 4 thereby rolling the round R onto runners 8. Runners 8 are spaced apart the tolerance distance, here assumed to be 5 feet. There must be sufficient runners to cover the length of the round bar R. Assume that switch 48 has been opened to deenergize all relays, that air and paint are supplied to the paint sprayers 20 and 32 and that power source 50 has charged capacitors 64 and 70 through resistances 62 and 68, respectively.

When a round bar R begins to roll down runners 8, the bar first momentarily closes switch 44. This energizes relays 56 and 58, latching the relays on through contacts 56C and 58C and closing contacts 56C1 and 58C1 to solenoids 28 and 40, respectively.

Figure 5:
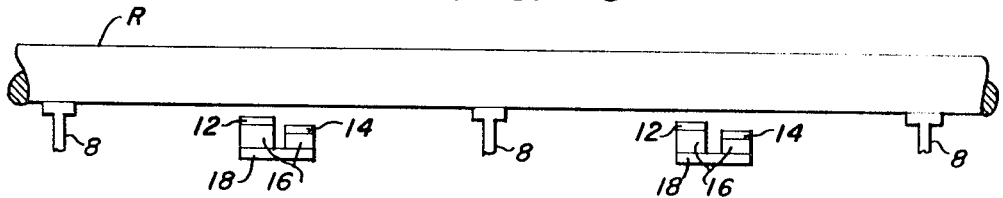
FIG. 5 shows a section of a bar on a runout table within special tolerance limits.

If the bar is straight or within the special tolerance, i.e., less than one-eighth inch out of straightness in 5 feet of length, as shown in FIG. 5, bar R will not touch contact strips 12 or 14 as it rolls down runners 8 but will next momentarily close switch 46. This will momentarily allow capacitors 64 and 70 to energize relays 60 and 66, respectively and close latching contacts 60C and 66C to permit the capacitors to continue to energize the relays after switch 46 is open. When contact 60C1 is closed, solenoid 28 opens valve 26 allowing paint from the special tolerance paint spray 20 to be sprayed on the bar as the bar rolls passed nozzle 30. When contact 66C is closed, solenoid 40 opens valve 38 allowing paint from the general tolerance paint sprayer 32 to be sprayed on the bar as the bar rolls passed nozzle 42. Relays 60 and 66 are energized just long enough as determined by the size of capacitors 64 and 70 to spray the desired amount of paint as the bar rolls passed the nozzles. Charging resistances 62 and 68 are large enough so relays 60 and 66 cannot directly draw enough current to close the relay contacts. As the bar R reaches the end of runners 8, switch 48 momentarily opens which deenergizes all relays and the bar falls into cradle 10. Capacitors 64 and 70 are then recharged for the next bar. Thus, a round bar meeting the special and the general tolerance requirements will receive two spaced applications of paint which may be different colors.

Figure 6:
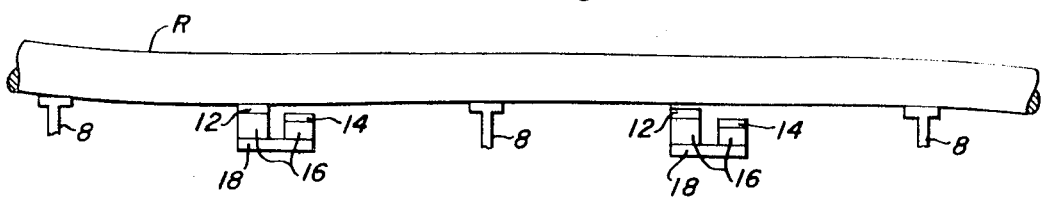
FIG. 6 shows a section of a bar on a runout table within general tolerance limits but not within special tolerance limits.

Assume next that round R is within the general tolerance, i.e., one-fourth inch out of straightness within 5 feet of length, but not within the special tolerance as shown in FIG. 6. The bar will then touch contact strip 12 completing the circuit to momentarily energize relay coil 52. Latching contacts 52C will keep relay 52 energized and the opening of contact 52C1 will deenergize relay coil 56 and will open contacts 56C1 thereby preventing solenoid 28 from becoming energized when switch 46 is closed. Thus only paint from the general tolerance spray nozzle 42 will be sprayed on the bar.

Figure 7:
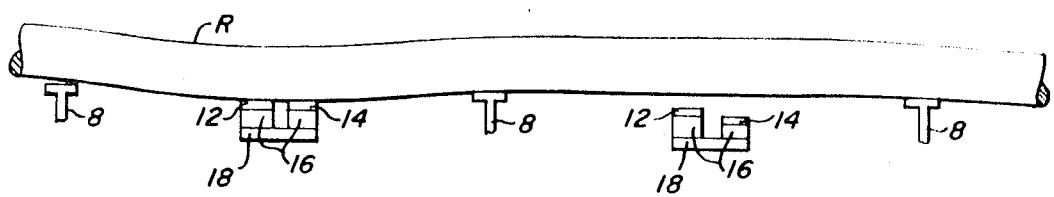
FIG. 7 shows a section of a bar on a runout table out of general tolerance limits.

If the round meets neither tolerance requirement, both contact strips 12 and 14 will be touched by the bar as shown in FIG. 7 and in addition to the action described when relay 52 is energized, relay 54 will also be energized, relay 58 deenergized, and solenoid 40 will not be energized. Thus no paint will be sprayed on bar R.

Figure 2:
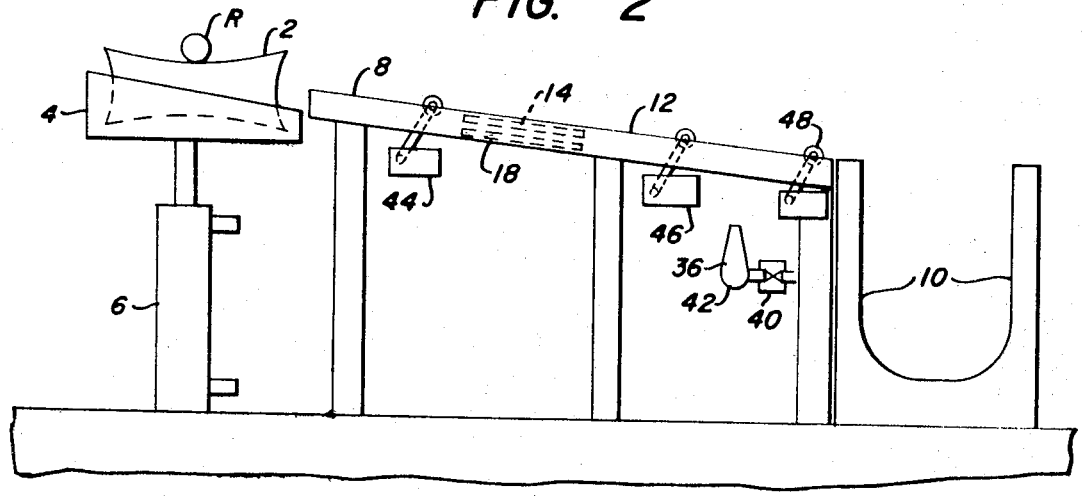
FIG. 2 is a sectional elevation along line II-II of FIG. 1.
Figure 3:
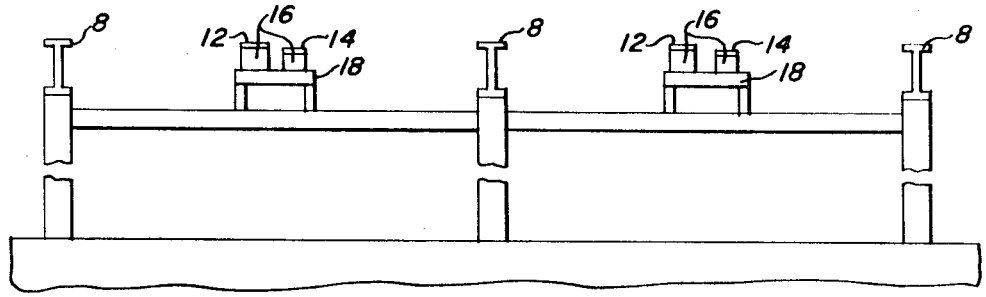
FIG. 3 is a sectional elevation along line III-III of FIG. 1.
Figure 8:
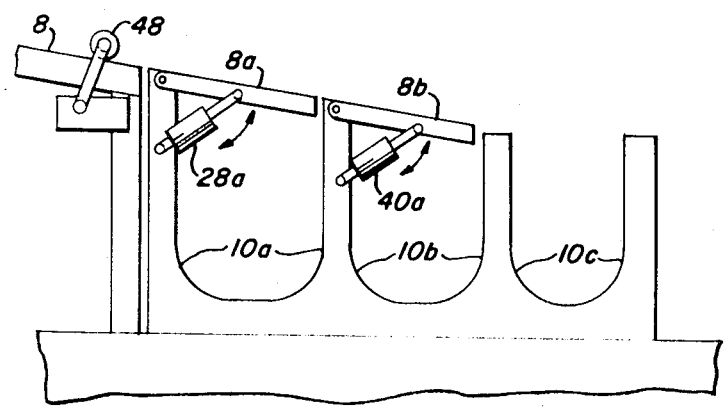
FIG. 8 shows an alternative embodiment of my invention wherein the lengths are separated according to tolerance classification.

While my invention has been described as a straightness classifier, paint marking round bars with two marks for special or narrow tolerance, with one mark for a general or a broad tolerance and no marks for out of tolerance, any practical number of classifications may be made with this system. Referring now to FIG. 8 which shows apparatus for separating lengths according to their tolerance classification, reference numeral 8 represents the runners as shown in FIG. 2. In this embodiment, however, if the round is within special tolerance, as shown in FIG. 5, solenoid 28a is actuated to lower runner section 8a and allow bar R to roll onto cradle 10a. In this case, the actuation of coil 28a is continued long enough after switch 48 is actuated to allow the bar to roll into cradle 10a. In a similar manner, if bar R is within general tolerance, as shown in FIG. 6, it will roll over section 8a and solenoid 40a will lower runner section b, allowing bar R to roll into cradle 10b. If the bar is out of tolerance, as shown in FIG. 7, neither solenoid 28a nor 40a will be actuated and the bar will fall into cradle 10c.

I claim:

1. Apparatus for determining the straightness tolerance of an elongated round metal object comprising a plurality of parallel inclined electrically conductive runners spaced apart a distance which defines the tolerance length, means for allowing the metal object to roll down over the runners, electrically conductive contact means spaced between each pair of adjacent runners and spaced below the plane of the runners a distance that defines the tolerance limit, and means connected to the contact means and the runners for indicating the tolerance characteristic of each elongated object as it rolls down over the runners.

2. Apparatus according to claim 1 in which said indicating means includes a paint sprayer for spraying an identifying tolerance color on each elongated round within tolerance.

3. Apparatus according to claim 2 in which said contact means includes a metal contact strip and an elastic mounting strip attached to the underside of said metal strip.

4. Apparatus according to claim 3 which includes a power source; a first relay having a normally closed contact connected to said power source and said contact means to energize said relay whenever said elongated round metal object touches said contact strip; a first normally open switch adapted to momentarily close when an elongated round begins to roll down said runners; a second relay having a first normally open contact and connected to said power source through said first switch and said normally closed contact so that said relay becomes energized when first switch is closed; a second normally open switch adapted to momentarily close when an elongated round has rolled beyond said contact strip; a third relay having a second normally open contact connected to the second normally open switch and the power source so that said third relay becomes momentarily energized when said second switch is momentarily closed; timing means connected to said third relay and said power source for keeping said third relay energized a predetermined period of time after said second switch is momentarily closed; solenoid means connected to said power source through said first and second normally open contacts and adapted to actuate said paint sprayer during said predetermined interval; and a third normally closed switch connected to said power source and adapted to momentarily open when an elongated round rolls down said runners beyond said paint sprayer and thereby deenergize said relays.

5. Apparatus according to claim 1 which includes means to separate the elongated objects according to their straightness tolerances.

* * * * *